United States Patent [19]
Gugsch et al.

[11] Patent Number: 5,452,884
[45] Date of Patent: Sep. 26, 1995

[54] ACTIVE ELASTIC MOUNT

[75] Inventors: Mathias Gugsch, München; Rudolf Langof, Ampermoching; Peter Indlekofer, Simbach, all of Germany

[73] Assignee: Metzeler Gimetall AG, Munich, Germany

[21] Appl. No.: 26,561

[22] Filed: Mar. 4, 1993

[30] Foreign Application Priority Data

Dec. 17, 1991 [DE] Germany .............. 41 41 637.6

[51] Int. Cl.⁶ .................................................. F16F 1/00
[52] U.S. Cl. .................. 267/140.14; 267/140.13
[58] Field of Search ................... 267/162, 219, 267/140.13, 140.14, 140.15, 160, 161; 188/378, 380; 248/550; 181/207, 208, 209, 204, 211

[56] References Cited

U.S. PATENT DOCUMENTS

| | | | |
|---|---|---|---|
| 3,661,178 | 5/1972 | Wichmann | 267/162 |
| 3,884,457 | 5/1975 | Leko | 267/162 |
| 4,869,474 | 9/1989 | Best | 267/140.14 |
| 5,238,232 | 8/1993 | Kobayashi | 267/140.12 |
| 5,249,782 | 10/1993 | Ide | 267/140.14 |
| 5,253,852 | 10/1993 | Pleva | 267/162 |

FOREIGN PATENT DOCUMENTS

| | | |
|---|---|---|
| 4021035 | 1/1992 | Germany . |
| 4021039 | 4/1992 | Germany . |

Primary Examiner—Robert J. Oberleitner
Assistant Examiner—Cliff Bartz
Attorney, Agent, or Firm—Herbert L. Lerner; Laurence A. Greenberg

[57] ABSTRACT

An active elastic mount for the insulated mounting of an assembly affected by vibration, in particular an internal combustion engine in a motor vehicle, includes an active decoupling system disposed on an insulated side of the mount. The active decoupling system has a permanent magnetic field. A coil vibrates in the permanent magnetic field. A decoupler mass is coupled to the coil for high-frequency vibration. A sensor detects predetermined operating parameters as a function of which the decoupler mass can be set into vibration electrodynamically. Two radially rigid, mutually parallel spring systems extend transversely to the coil and elastically suspend the coil for exact vertical guidance of the coil.

13 Claims, 2 Drawing Sheets

ACTIVE ELASTIC MOUNT

SPECIFICATION

The invention relates to an active elastic mount for the insulated mounting of an assembly affected by vibration, in particular an internal combustion engine in a motor vehicle, including an active decoupling system with a decoupler mass for high-frequency vibration, which can be set into vibration electrodynamically as a function of predetermined operating parameters that are detectable by a sensor.

Such a mount has already been proposed, both for hydraulically damped two-chamber engine mounts, in German Published, Non-Prosecuted Application DE 40 21 039 A1, and also for pure rubber mounts, in German Published, Non-Prosecuted Application DE 40 21 035 A1. In hydraulically damped mounts, such an engine mount has the advantage of having a decoupling system which effects reliable decoupling of high-frequency vibration regardless of high fluid pressures in the engine mount, and which moreover does not threaten the fundamental capability of the engine mount to function as a damping element for low frequencies, if the decoupling system should fail.

However, coupling a decoupler mass and a coil to a single diaphragm in that way may involve mechanical problems, in the form of limited durability of such a diaphragm and decreasing restoring force. In particular, difficulties arise for the functional capability of the decoupling system if forces are introduced obliquely and if the vertical guidance of the coil is not exact.

It is accordingly an object of the invention to provide an active elastic mount, which overcomes the hereinaforementioned disadvantages of the heretofore-known devices of this general type, which provides a configuration and a structure for the moving parts of such a decoupling system that is mechanically much more stable and less vulnerable to fatigue and with which even relatively large decoupler masses can be reliably controlled, and with which exact guidance of the coil and decoupler masses with simultaneous absorption of shear forces is made possible.

With the foregoing and other objects in view there is provided, in accordance with the invention, an active elastic mount for the insulated mounting of an assembly affected by vibration, in particular an internal combustion engine in a motor vehicle, comprising an insulated side of the mount, an active decoupling system disposed on the insulated side, the active decoupling system having a permanent magnetic field, a coil vibrating in the permanent magnetic field, a decoupler mass coupled to the coil for high-frequency vibration, a sensor for detecting predetermined operating parameters as a function of which the decoupler mass can be set into vibration electrodynamically, and two radially rigid, mutually parallel spring systems extending transversely to the coil and elastically suspending the coil for exact vertical guidance of the coil.

In accordance with another feature of the invention, the decoupler mass is disposed immediately adjacent the coil, the decoupler mass has a vertical and a radial length, the decoupler mass is surrounded in each of two mutually spaced apart planes by a respective one of the spring systems allowing a vertical motion, and the decoupling system has a rigid abutment on which the spring systems are supported.

With such axially spaced-apart spring systems which nevertheless extend exactly parallel, accurate guidance of the decoupler mass and the coil are thus definitely assured, so that tilting of the coil in particular, and inexact insertion into the magnetic field, will be reliably avoided. This kind of double guidance is especially practical because in this way transverse accelerations and shear forces that arise in motor vehicles can be reliably controlled.

In accordance with a further feature of the invention, the two spring systems include annular springs or diaphragms that are rigid in the radial direction.

In accordance with an added feature of the invention, the decoupler mass has a prismatic or cylindrical cross section and is tightly surrounded by the annular springs at its upper and lower ends.

In accordance with an additional feature of the invention, there are provided supports for the abutment, the annular springs including substantially concentric inner and outer spring rings and radial ribs joining the spring rings together on a diameter, the inner spring rings being fixed on the decoupler mass, and the outer spring rings having retaining eyelets formed therein being offset by 90° from the radial ribs for receiving the supports.

In accordance with yet another feature of the invention, the radial centers of the two outer spring ring halves are located slightly outside the center of the inner spring rings, in order to enable greater mobility as a result.

In accordance with yet a further feature of the invention, the two annular springs are disposed offset from one another by 90° relative to their supports, because this assures reliable vertical guidance of the decoupler mass.

In accordance with yet an added feature of the invention, the decoupler mass has an upper end surface, a bar-like additional mass on the upper end surface protruding laterally beyond the decoupler mass, the additional mass having projecting ends with lower surfaces, and rubber cushions on the lower surfaces of the projecting ends serving as a motion stop toward the top of the abutment.

In accordance with a concomitant feature of the invention, there is provided a permanent magnet producing the permanent magnetic field, the permanent magnet having an upper surface with an annular gap formed therein into which the coil is inserted.

Other features which are considered as characteristic for the invention are set forth in the appended claims.

Although the invention is illustrated and described herein as embodied in an active elastic mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
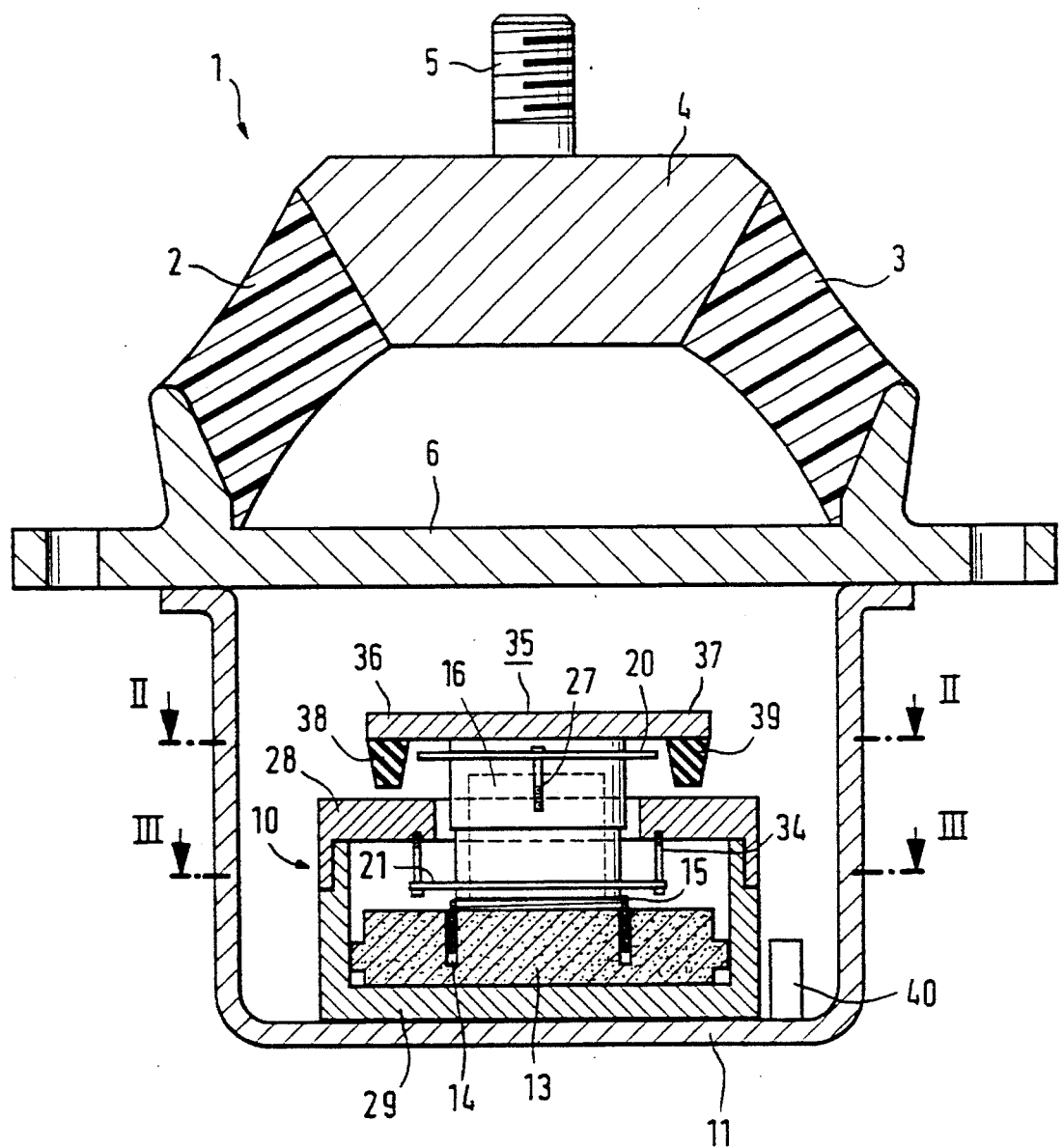
FIG. 1 is a diagrammatic, longitudinal-sectional view of an active mount having an external decoupling system.

Referring now to the figures of the drawing in detail and first, particularly, to FIG. 1 thereof, there is seen a mount which may be a wedge mount 1 having two rubber bodies 2 and 3 being positioned obliquely with respect to one another and having an upper, central bearing plate 4 and bolts 5 for fixation of a non-illustrated engine. The two rubber bodies 2 and 3 are supported on a support 6 facing toward the vehicle body.

However, a hydraulically damped mount may also be employed in the same way, instead of a pure rubber mount.

In order to enable optimal decoupling of high-frequency vibration, an additional decoupling system 10 is provided, outside the actual load-bearing mount 1 and on an insulated, vehicle-body side of the mount. In the exemplary embodiment which is shown, this decoupling system 10 is flanged directly to the support 6 by a cup-shaped housing 11, but a disposition at some other point of the support 6 or relative to it is also possible.

A permanent magnet 13 with an annular gap 14 in its upper surface is disposed in the cup-shaped housing 11, and an electrical coil 15 is inserted into this annular gap 14. An decoupler mass 16, which has the form of a hollow cylinder in the illustrated exemplary embodiment but may also have any other shape, is attached directly to this coil 15.

Figure 2:
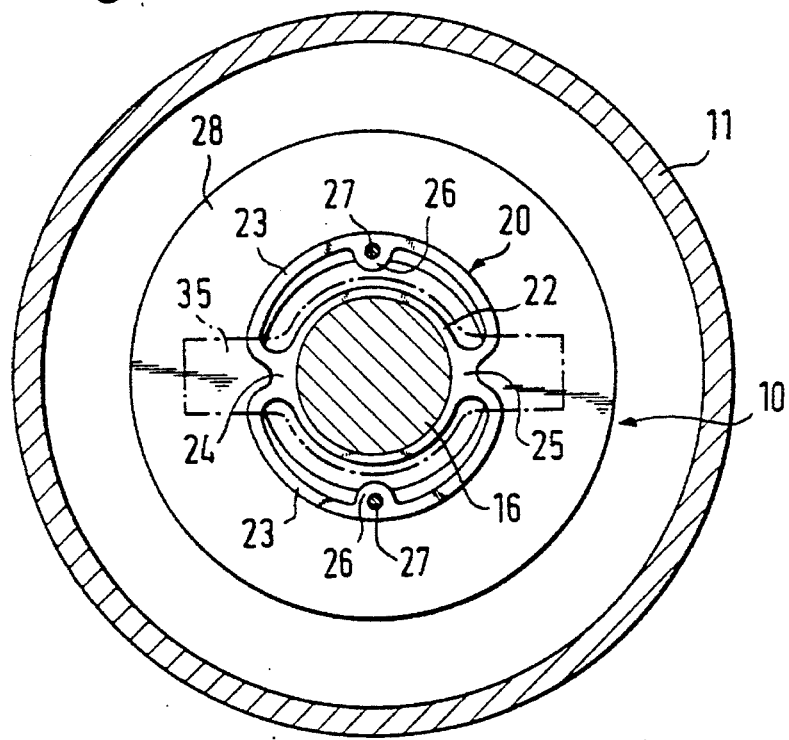
FIG. 2 is a cross-sectional view of the decoupling system which is taken along the line II—II of FIG. 1, in the direction of the arrows.
Figure 3:
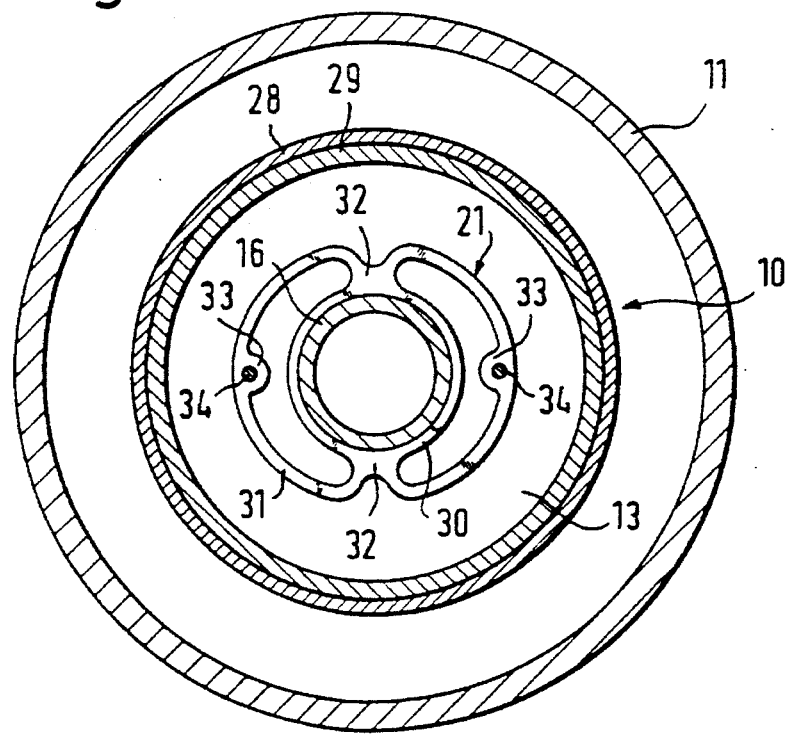
FIG. 3 is a cross-sectional view of the decoupling system which is taken along the line III—III of FIG. 1, in the direction of the arrows.

As can also be seen from the cross sections of FIGS. 2 and 3, this decoupler mass 16 with the coil 15 is axially resiliently supported in the following way:

Annular springs 20 and 21, which are shown in further detail in plan views in FIGS. 2 and 3, each surround the decoupler mass 16 in the region of a respective one of its upper and lower ends. The annular springs include an inner spring ring 22, which form-lockingly surrounds the decoupler mass 16, and an outer spring ring 23. A form-locking connection is one which connects two elements together due to the shape of the elements themselves, as opposed to a force-locking connection, which locks the elements together by force external to the elements. The two spring rings 22 and 23 are joined to one another by radial ribs 24 and 25, which are each located on a diameter. The two outer spring ring halves 23 may have radial centers that are located slightly outside the center of the inner spring ring 22, so that they bulge outward somewhat. The outer spring rings 23 have retaining eyelets 26 which are offset by 90° from the two radial ribs 24 and 25 and from which bar-like supports, for instance in the form of screw pins 27, lead downward to a rigid abutment 28. By way of example, the rigid abutment 28 may be formed by a cap of a housing 29 surrounding the magnet 13 and extending approximately halfway up the height of the decoupler mass 16.

As is shown in FIG. 3, the lower annular spring 21 likewise includes an inner spring ring 30 and an outer spring ring 31, which are joined together by radial ribs 32. However, this lower annular spring 21 is installed in a position which is offset by 90° from the upper annular spring 20, so that retaining pins 34, which begin at retaining eyelets 33, are likewise screwed upward into the lower surface of the retaining plate 28, again with an offset of 90°. The inner spring ring 30 then surrounds the upper region of the coil 15 or the lower end of the decoupler mass 16.

This suspension of the coil and the decoupler mass and the structure of the corresponding annular springs accordingly assure stable retention and accurate axial guidance of the decoupler mass 16.

A bar-like additional mass 35 may also be disposed on the top of the decoupler mass 16, as is shown in phantom lines in a plan view in FIG. 2. The additional mass 35 has ends 36 and 37 protruding toward both sides and rubber cushions 38 and 39 on the lower surface of each respective one of the ends 36 and 37, which act as a stop in the event of excessive axial motions toward the top of the abutment 28.

In order to trigger this decoupling system 10, a sensor 40, which is only diagrammatically shown, is provided in the immediate vicinity of the system 10. The sensor 40 is connected to a non-illustrated power supply, and is joined to the coil 15 of the decoupling system through non-illustrated connecting lines. This sensor 40 may have a filter that detects only high-frequency vibration, for example higher than 50 Hz, on the side of the mount toward the vehicle body and outputs an electrical signal that is proportional to these vibrational motions. This is done in this way with suitable phase displacement in order to achieve a contrary vibration of the decoupler mass 16 and thus bring about an eradication of high-frequency vibration.

However, instead of the annular springs shown in the exemplary embodiment, it is also possible to effect the retention of the coil and the decoupler mass by means of two radially rigid diaphragms, which are fixed on the top and the bottom of the decoupler mass and are held in place on their edges.

An effective external decoupling system is accordingly created that is mechanically very stable in structure and effects optimal dynamic decoupling at very specific frequencies over the entire functional range of the mount. Due to the transverse acceleration, which occurs only in motor vehicles and acts upon the mounts, this kind of double guidance with two parallel spring systems is especially advantageous, so as to ensure that the coil will be inserted exactly into the magnetic gap at all times. In particular, the second spring system then absorbs the incident moments, since the mount itself cannot absorb all of the shear forces, and therefore as a result the decoupler mass is supported against these forces.

We claim:

1. An active elastic mount for the insulated mounting of an assembly affected by vibration, comprising:

an insulated side of the mount, an active decoupling system disposed on said insulated side, said active decoupling system having a permanent magnetic field, a coil vibrating in said permanent magnetic field, a decoupler mass coupled to said coil for high-frequency vibration, a sensor for detecting predetermined operating parameters as a function of which said decoupler mass can be set into vibration electrodynamically, and two radially rigid, mutually parallel spring systems extending transversely to said coil and elastically suspending said coil for exact vertical guidance of said coil; wherein said decoupler mass is disposed immediately adjacent said coil, said decoupler mass has a vertical and a radial length, said decoupler mass is surrounded in each of two mutually spaced apart planes by a respective one of said spring systems allowing a vertical motion, and said decoupling system has a rigid abutment on which said spring systems are supported.

2. The mount according to claim 1, wherein said spring systems include annular springs.

3. The mount according to claim 2, wherein said decoupler mass has a prismatic cross section with upper and lower ends and is tightly surrounded by said annular springs at said upper and lower ends.

4. The mount according to claim 3, including supports for said abutment, said annular springs including substantially concentric inner and outer spring rings and radial ribs joining said spring rings together on a diameter, said inner spring rings being fixed on said decoupler mass, and said outer spring rings having retaining eyelets formed therein being offset by 90° from said radial ribs for receiving said supports.

5. The mount according to claim 4, wherein said inner spring rings have a center, and said outer spring rings have halves with centers disposed slightly outside said center of said inner spring rings.

6. The mount according to claim 4, wherein said two annular springs are disposed offset from one another by 90° relative to said supports.

7. The mount according to claim 2, wherein said decoupler mass has a cylindrical cross section with upper and lower ends and is tightly surrounded by said annular springs at said upper and lower ends.

8. The mount according to claim 7, including supports for said abutment, said annular springs including substantially concentric inner and outer spring rings and radial ribs joining said spring rings together on a diameter, said inner spring rings being fixed on said decoupler mass, and said outer spring rings having retaining eyelets formed therein being offset by 90° from said radial ribs for receiving said supports.

9. The mount according to claim 8, wherein said inner spring rings have a center, and said outer spring rings have halves with centers disposed slightly outside said center of said inner spring rings.

10. The mount according to claim 8, wherein said two annular springs are disposed offset from one another by 90° relative to said supports.

11. The mount according to claim 1, wherein said spring systems include diaphragms being rigid in the radial direction.

12. The mount according to claim 1, wherein said decoupler mass has an upper end surface, a bar-like additional mass on said upper end surface protruding laterally beyond said decoupler mass, said additional mass having projecting ends with lower surfaces, and rubber cushions on said lower surfaces of said projecting ends serving as a motion stop toward the top of said abutment.

13. The mount according to claim 1, including a permanent magnet producing said permanent magnetic field, said permanent magnet having an upper surface with an annular gap formed therein into which said coil is inserted.

* * * * *